United States Patent
Stoll et al.

(10) Patent No.: US 7,706,272 B2
(45) Date of Patent: Apr. 27, 2010

(54) METHOD AND APPARATUS FOR COMPUTING VIRTUAL CONCATENATION GROUP BANDWITH DATA

(75) Inventors: Dieter Stoll, Erlangen (DE); Wolfgang Thomas, Nürnberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1406 days.

(21) Appl. No.: 10/945,511

(22) Filed: Sep. 20, 2004

(65) Prior Publication Data

US 2006/0062222 A1 Mar. 23, 2006

(51) Int. Cl.
*G01R 31/08* (2006.01)
(52) U.S. Cl. ....................... 370/235; 370/252
(58) Field of Classification Search ........ None
See application file for complete search history.

(56) References Cited

U.S. PATENT DOCUMENTS

| | | | |
|---|---|---|---|
| 6,636,529 B1 * | 10/2003 | Goodman et al. | 370/469 |
| 6,697,373 B1 | 2/2004 | Sandstrom | |
| 6,965,612 B2 * | 11/2005 | Chohan et al. | 370/465 |
| 2003/0043861 A1 | 3/2003 | Saito | |
| 2004/0090955 A1 * | 5/2004 | Berthaud et al. | 370/386 |
| 2005/0135435 A1 * | 6/2005 | Ishii | 370/539 |

OTHER PUBLICATIONS

"Benefits and Implementation of LCAS in Ethernet over SONET/SDH Networking", Vitesse Semiconductor Corporation, May 2004, pp. 1-5.*
Larry Choy, "Virtual Concatenation Tutorial: Enhancing SONET/SDH Networks for Data Transport," J. of Optical Networking, vol. 1, No. 1, Jan. 2002, pp. 18-29.
European Search Report, Feb. 25, 2005, Pat No. 04255714.0-1237.

* cited by examiner

*Primary Examiner*—Jayanti K Patel
*Assistant Examiner*—Jung Park
(74) *Attorney, Agent, or Firm*—Wall & Tong, LLP (57) ABSTRACT

The invention comprises a method and apparatus for computing virtual concatenation group bandwidth data of at least one virtual concatenation group. Specifically, the method comprises determining at least one elementary path of which at least one virtual concatenation group is composed, determining elementary path data associated with the at least one elementary path and computing virtual concatenation group bandwidth data using the elementary path data.

19 Claims, 5 Drawing Sheets

METHOD AND APPARATUS FOR COMPUTING VIRTUAL CONCATENATION GROUP BANDWITH DATA

FIELD OF THE INVENTION

The invention relates to the field of network performance monitoring and, more specifically, to the computation of bandwidth data in networks supporting dynamic bandwidth changes.

BACKGROUND OF THE INVENTION

The optical networks of today typically use static paths which may take from minutes to days to provision, and which often remain unchanged for days to months. The paths, which are typically set up by a service provider using central management systems, are often contiguously concatenated. In such traditional synchronous optical networks (SONET) and synchronous digital hierarchy (SDH) networks, failure of a constituent path will cause the entire contiguously concatenated path to fail as well. The service providers charge their customers for the availability and transmission quality of these static paths, where availability and transmission quality are measured using SONET/SDH performance monitoring capabilities.

The next generation of optical networks have recently introduced virtually concatenated paths which allow an arbitrary number of SONET and SDH elementary paths (such as VT-1.5s, STS1s and the like) to be logically grouped in virtual concatenation groups (VCGs). The VCG members are transported as synchronous payload envelopes across the SONET/SDH network and recombined at the VCG termination sink. Furthermore, next generation optical networks have recently begun offering a capability to dynamically create and delete paths, and to increase or decrease bandwidth of existing paths, without the intervention of a central management system.

The VCGs are further enriched by the link capacity adjustment scheme (LCAS), which allows dynamic reconfiguration of VCGs, including dynamic changes in the bandwidth of VCGs. This capability is used to maintain part of the transmission capacity of a VCG even if several constituent elementary paths experience failures. Using the link capacity adjustment scheme, failed channels are automatically removed from the VCG without loss of data, and in the absence of network errors.

In such dynamically switched networks, a paradigm of fixed bandwidth per path is no longer required. As a result, service providers are beginning to charge customers not only for availability and transmission quality of a provided path, but for the bandwidth made available to those customers in a provided path. Since these dynamic bandwidth changes are out of the control of the service provider (i.e., occurring in a decentralized manner without using service provider management systems), bandwidth monitoring performance parameters associated with dynamic bandwidth allocation are not currently supported by SONET/SDH networks.

The SONET/SDH performance monitoring is currently implemented using various combinations of element and network management systems that are used to measure the availability and transmission quality of a path; however, monitoring of path bandwidth variability is not currently supported. Thus, any autonomous changes in a switched network (such as new path setup, existing path failure, bandwidth adaptations and the like) currently result in notifications such as alarms and log file entries. The service provider management systems use these notifications received from the network elements in order to charge customers for bandwidth made available to the customers over time.

Using this notification information, management systems can estimate the available bandwidth over time; however, this approach has some serious drawbacks. First, the bandwidth estimate is inaccurate since it is not directly measured by the network elements, but rather is derived from events that occur in the network. Furthermore, the bandwidth estimate is unreliable as it depends on a permanent management connection between network elements and the management systems. If this connection is temporarily unavailable, or the management system itself is temporarily unavailable, the data required to estimate the bandwidth provided to a customer is lost, and the required billing data cannot be calculated.

SUMMARY OF THE INVENTION

Various deficiencies of the prior art are addressed by the present invention comprising methods and apparatus for computing virtual concatenation group bandwidth data of at least one virtual concatenation group. Specifically, a method according to one embodiment comprises determining at least one elementary path of which at least one virtual concatenation group is composed, determining elementary path data associated with the at least one elementary path and computing virtual concatenation group bandwidth data using the elementary path data.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a communication architecture using numerous access technologies and SONET/SDH transport technology; however, the methodology and apparatus of the invention can readily be applied to other networks (and network topologies) in which bandwidth is computed. The present invention enables more accurate and reliable computation of virtual concatenation group bandwidth data in an environment in which the bandwidth may be continuously adjusted (either automatically in response to network changes or manually in response to user commands). Furthermore, the present invention enables the accumulation of the virtual concatenation group bandwidth data over time in order to integrate virtual concatenation group bandwidth data over specific periods of time.

Figure 1:
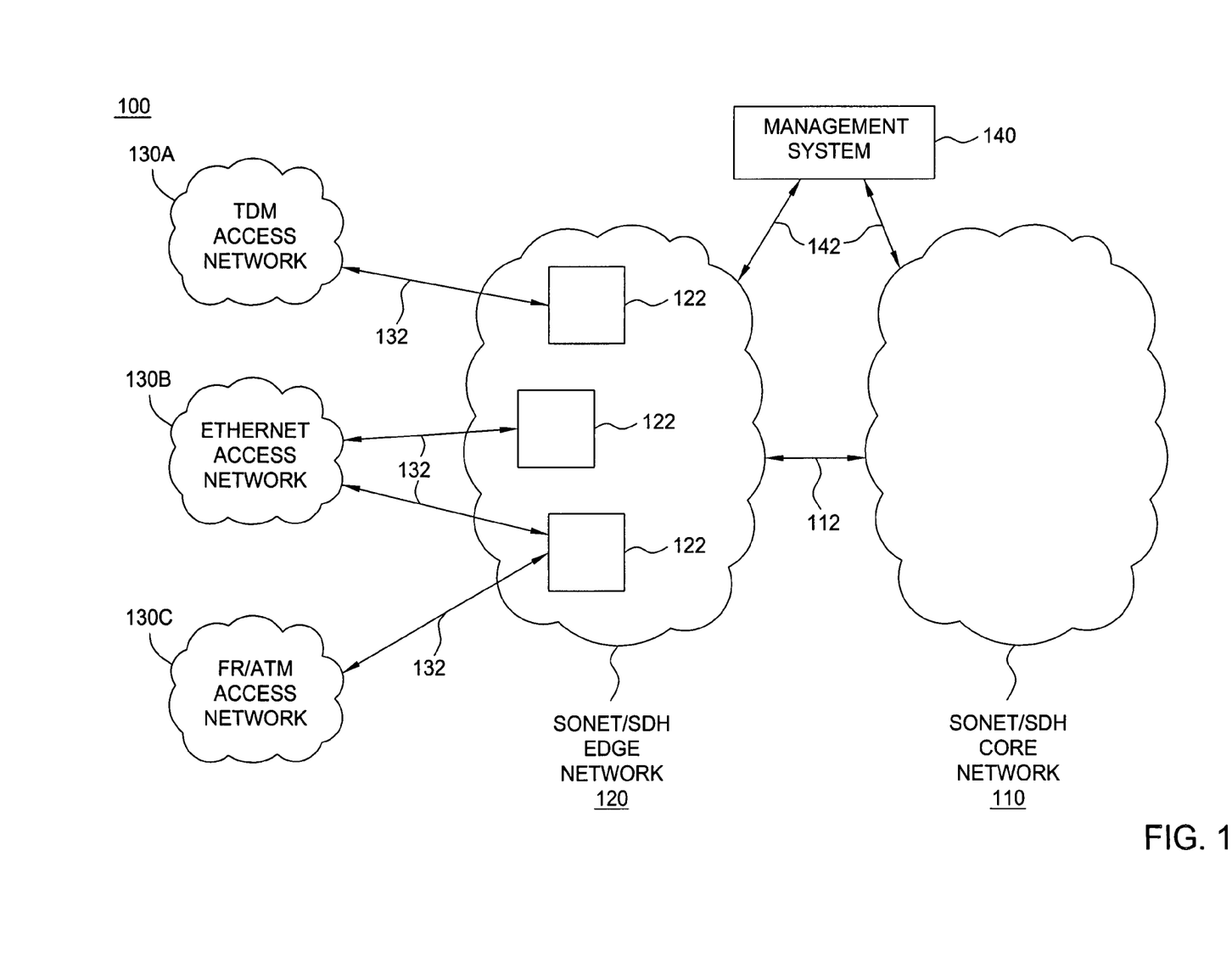
FIG. 1 depicts a high level block diagram of a communication network architecture.

FIG. 1 depicts a high level block diagram of a communication network architecture. Specifically, communication network architecture 100 of FIG. 1 comprises a SONET/SDH core network 110, a SONET/SDH edge network 120 and a plurality of access networks 130A-130C (collectively, access networks 130). The SONET/SDH core network 110 and the SONET/SDH edge network 120 communicate via core communication link 112. Although one core communication link 112 is depicted, more core communication links may be used. The SONET/SDH edge network 120 and access networks 130 communicate via the plurality of edge communication links 132.

Although not depicted, those skilled in the art will appreciate that the SONET/SDH core network 110 comprises a plurality of interconnected network elements (such as switches, wavelength division multiplexing units, optical cross-connect systems and the like) and associated communication links. Although one SONET/SDH core network 110 is depicted, additional SONET/SDH core networks may be utilized for transporting traffic between associated SONET/SDH edge networks.

As depicted in FIG. 1, SONET/SDH edge network 120 comprises a plurality of SONET/SDH edge nodes 122. Although three SONET/SDH edge nodes are depicted, fewer or more SONET/SDH edge nodes, as well as other edge network equipment (such as switches, optical cross-connect systems and the like), and associated communication links, may be deployed within a SONET/SDH edge network. Although one SONET/SDH edge network 120 is depicted, additional SONET/SDH edge networks may be deployed in order to groom traffic from the plurality of access networks 130 for transmission over the SONET/SDH core network 110.

As depicted in FIG. 1, the plurality of access networks 130 comprise a time division multiplexing (TDM) access network 130A, an Ethernet access network 130B and a frame relay (FR)/asynchronous transfer mode (ATM) access network 130C. Although not depicted, those skilled in the art will appreciate that each of the access networks 130 comprises a plurality of interconnected network elements (such as routers, switches, digital cross-connect systems and the like) depending on the type of the access network.

The access networks 130 access the SONET/SDH edge network 120 via a plurality of SONET/SDH edge nodes 122 and an associated plurality of edge communication links 132. Although three access networks 130 are depicted, fewer or more access networks may be deployed. An access network may support any access technology as known in the art (such as wireless, Internet Protocol (IP) networks, cable networks, and like access technologies and networks).

The SONET/SDH edge nodes 122 comprise a plurality of line cards (on the access network facing side), each of which is designed to receive data (from access networks 130) and transmit data (towards access networks 130) using the technology of the access network to which the respective line card is connected. Similarly, each of the SONET/SDH edge nodes 122 comprise a plurality of line cards (on the SONET/SDH network facing side), each of which is designed to receive data (from SONET/SDH core network 110) and transmit data (towards SONET/SDH core network 110) using SONET/SDH systems. Furthermore, the SONET/SDH edge nodes typically include additional power cards, control cards, backup interface cards and the like modules that support the data receiver cards and data transmitter cards.

In general, each of the SONET/SDH edge nodes 122 operates as a SONET/SDH path terminating equipment (PTE). As such, for data received from the access networks 130, each of the SONET/SDH edge nodes 122 operates as a VCG-originating node (VCG transmitter). Thus, for data received from the access networks 130, the SONET/SDH edge nodes 122 generate VCGs for transport across SONET/SDH edge network 120 and SONET/SDH core network 110. Similarly, for data received from SONET/SDH core network 110, each of the SONET/SDH edge nodes 122 operates a VCG-terminating node (VCG receiver). Thus, for data received from SONET/SDH edge network 120, the SONET/SDH edge nodes 122 terminate VCGs in order to extract the elementary paths for transmission towards the respective access networks 130.

As depicted in FIG. 1, management system 140 communicates with network elements (not shown) of SONET/SDH core network 110 via at least one of a plurality of management communication links 142. Similarly, the management system 140 communicates with network elements of the SONET/SDH edge network 120 (illustratively, SONET/SDH edge nodes 122) via at least one of the plurality of management communication links 142. In one embodiment, management system 140 may communicate with at least one of SONET/SDH core network 110 and SONET/SDH edge network 120 via at least one element management system (not shown). In one embodiment, the management system 140 is at least one of an element management system, a network management system, a service management system, a billing system and the like.

Figure 2:
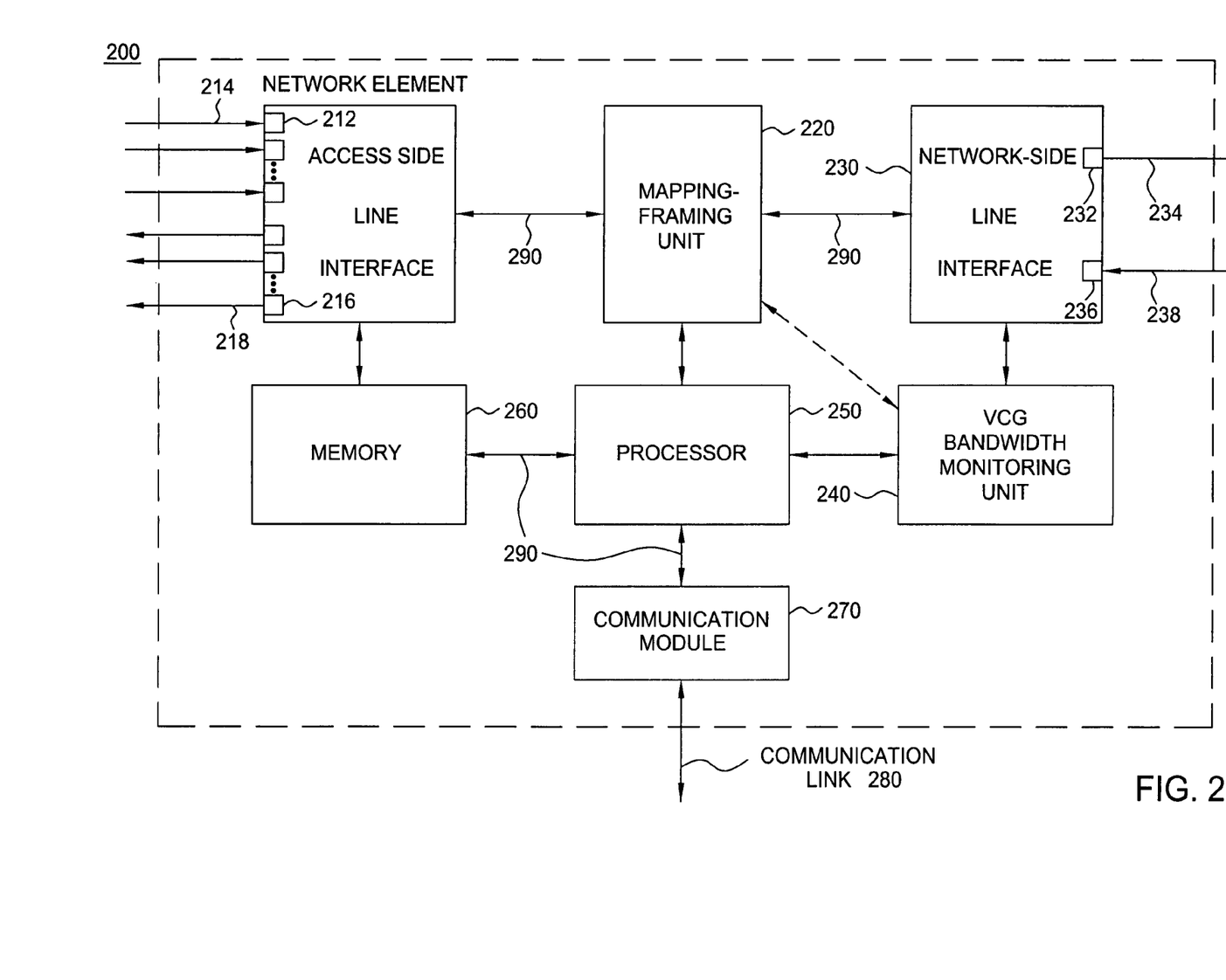
FIG. 2 depicts a high level block diagram of a network element including a virtual concatenation group bandwidth computation unit.

FIG. 2 depicts a high level block diagram of a network element including a VCG bandwidth computation unit. Specifically, network element 200 of FIG. 2 comprises an access-side line interface 210, a mapping-framing unit 220, a network-side line interface 230, a VCG bandwidth computation unit 240, a processor 250, a memory 260 and a communication module 270. In one embodiment, network element 200 of FIG. 2 is implemented as at least a portion of at least one of the plurality of SONET/SDH edge nodes 122 depicted in FIG. 1 and described herein. In another embodiment, the network element 200 of FIG. 2 is deployed within SONET/SDH core network 110.

As depicted in FIG. 2, the access-side line interface 210 is coupled to the mapping-framing unit 220. Similarly, network-side line interface 230 is coupled to the mapping-framing unit 220. The mapping-framing unit 220 is coupled to the processor 250. The VCG bandwidth computation unit 240 is coupled to the network-side line interface 230 and the processor 250. The memory 260 and communication module 270 are coupled to processor 250. In one embodiment, the VCG bandwidth computation unit 240 is optionally coupled to mapping-framing unit 220. As depicted in FIG. 2, the coupling described above is implemented using a plurality of internal communication link 290.

The access-side line interface 210 comprises a plurality of receive ports 212 for receiving network data from at least one of the plurality of access networks 130. The access network data is received via a respective plurality of access network receive-links 214. The receive ports 212 transmit the received access network data towards the mapping-framing unit 220 for processing for transmission towards at least one SONET/SDH edge network.

Similarly, the access-side line interface 210 comprises a plurality of transmit ports 216 for transmitting network data towards at least one of the plurality of access networks 130. The access network data is transmitted via a respective plurality of access network transmit-links 218. The transmit ports 216 receive the access network data from the mapping-framing unit 220.

For example, an access-side line interface may be a network interface card (NIC), such as a T-carrier 1 (T1) card designed to receive and transmit TDM traffic at a rate of approximately 1.544 megabits-per-second (Mbps), a 10 Mbps Ethernet card designed to receive and transmit Ethernet traffic at approximately 10 Mbps, an unchannelized FR Digital Signal Level 3 (DS3) card designed to receive and transmit FR traffic at approximately 45 Mbps, a DS3 ATM card designed to receive and transmit ATM traffic at approximately 45 Mbps and like interfaces for receiving and transmitting access network data. Such access-side line interfaces typically include at least one receive port and at least one transmit port.

The network-side line interface 230 comprises a transmit port 232 for transmitting network data received from at least one of the plurality of access networks 130 towards other network elements within the SONET/SDH edge network 120 and SONET/SDH core network 110. The network data is transmitted via a respective transport network transmit-link 234. The transmit port 232 receives the network data from mapping-framing unit 220.

Similarly, network-side line interface 230 comprises a receive port 236 for receiving SONET/SDH network data from network elements within SONET/SDH access network 120. The network data is received via a respective transport network receive-link 238. The receive port 236 transmits the SONET/SDH network data towards the mapping-framing unit 220 for processing to convert the data from SONET/SDH format into a format corresponding to the access network towards which the network data is transmitted.

Although only one access-side line interface and one network-side line interface are depicted, a network element may contain additional access-side line interfaces and/or network-side line interfaces. Although three receive ports and three transmit ports are depicted with respect to the access-side line interface 210, an access-side line interface may include fewer or more receive ports and transmit ports. Similarly, although one receive port and one transmit port are depicted with respect to the network-side line interface 230, a network-side line interface may include more receive ports and transmit ports.

As described above, mapping-framing unit 220 is coupled to access-side line interface 210, network-side line interface 230, processor 250, and, optionally, to VCG bandwidth computation unit 240. In one embodiment, at least a portion of the functionality implemented in the mapping-framing unit 220 may be implemented in at least one of the access-side line interface 210 and the network-side line interface 230. For example, at least one of the access-side line interface 210 and the network-side line interface 230 may include at least one of a SONET/SDH mapping unit, a SONET/SDH framer, a virtual tributary (VT)/tributary unit (TU) pointer processor, clock data recovery unit and like modules.

The mapping-framing unit 220, in combination with access-side line interface 210, network-side line interface 230, processor 250 and memory 260, supports numerous features required to originate and terminate VCGs. For SONET/SDH network data transmitted from transmit port 232 on the network-side line interface 230 towards at least one SONET/SDH network, network-side line interface 230 operates as a VCG-originating node. For SONET/SDH network data received by receive port 234 on the network-side line interface 230 from at least SONET/SDH network, the network-side line interface 230 operates as a VCG-terminating node.

In support of the creation of VCGs, virtual concatenation (VC), link capacity adjustment scheme (LCAS), generic framing procedure (GFP) framing, media access control (MAC), packet scheduler and like modules and services are implemented in the mapping-framing unit 220. Using various combinations of these modules and services, the mapping-framing unit 220 supports the processing of data streams of different access technologies for inclusion in corresponding SONET/SDH elementary paths. Furthermore, the mapping-framing unit 220 performs the processing required in order to map SONET/SDH elementary paths into VCGs transported across SONET/SDH networks.

In general, VC is an inverse multiplexing procedure whereby contiguous bandwidth is broken into individual synchronous payload envelopes (SPEs) at the source transmitter. Typically, virtual concatenation is defined at two levels: high-order and low-order. A high-order VC module groups the payload of different Synchronous Transport Signals (STS1, STS3 and the like, for SONET) and Administrative Units (AU-3, AU-4 and the like, for SDH) at higher rates (such as 51.840 Mbps for STS1, 155.52 Mbps for STS3 and other rates as known in the art). A low-order VC module groups the payload of different VTs (VT-1.5, VT-6 and the like, for SONET) and TUs (TU-11, TU-12 and the like, for SDH) at lower rates such as 1.544 Mbps, 2.048 Mbps and other rates as known in the art.

In order to utilize virtual concatenation groups, the concept of virtual concatenation is extended such that SPEs generated as a result of virtual concatenation methods are logically represented in at least one VCG. The virtual concatenation group members (elementary paths of which the VCGs are composed) are transported across the SONET/SDH network as individual SPEs and recombined at the far end VCG-terminating equipment. In other words, access network data streams received by access-side line interface 210 are mapped into elementary paths. The elementary paths are logically concatenated into VCGs for transmission over SONET/SDH networks with greater bandwidth efficiency.

Similarly, in support of the termination of VCGs, de-mapping, GFP de-framing, delay compensation, VCG elementary path extraction and like modules and services are implemented in the mapping-framing unit 220. Using various combinations of these modules and services, the mapping-framing unit 220 supports the processing required for extraction of SONET/SDH elementary paths from VCGs. Furthermore, the mapping-framing unit 220 performs the processing required to convert the SONET/SDH elementary paths into data streams corresponding to the different access technologies supported by the access networks 130.

In other words, network-side line interface 230 receives a SONET/SDH signal from a SONET/SDH network and transmits the SONET/SDH signal to the mapping-framing unit 220. The mapping-framing unit 220 processes the SONET/SDH signal to extract the SONET/SDH elementary paths from the VCG. The elementary paths are then processed to extract the data streams for transmission towards the respective access networks for which the data streams are intended, via access-side line interface 210. For example, if an STST1 elementary path is extracted from a VCG upon termination of the VCG, that STS1 elementary path is processed to extract the corresponding data streams of which it is composed (e.g., an Ethernet signal intended for Ethernet access network 130B).

Figure 3:
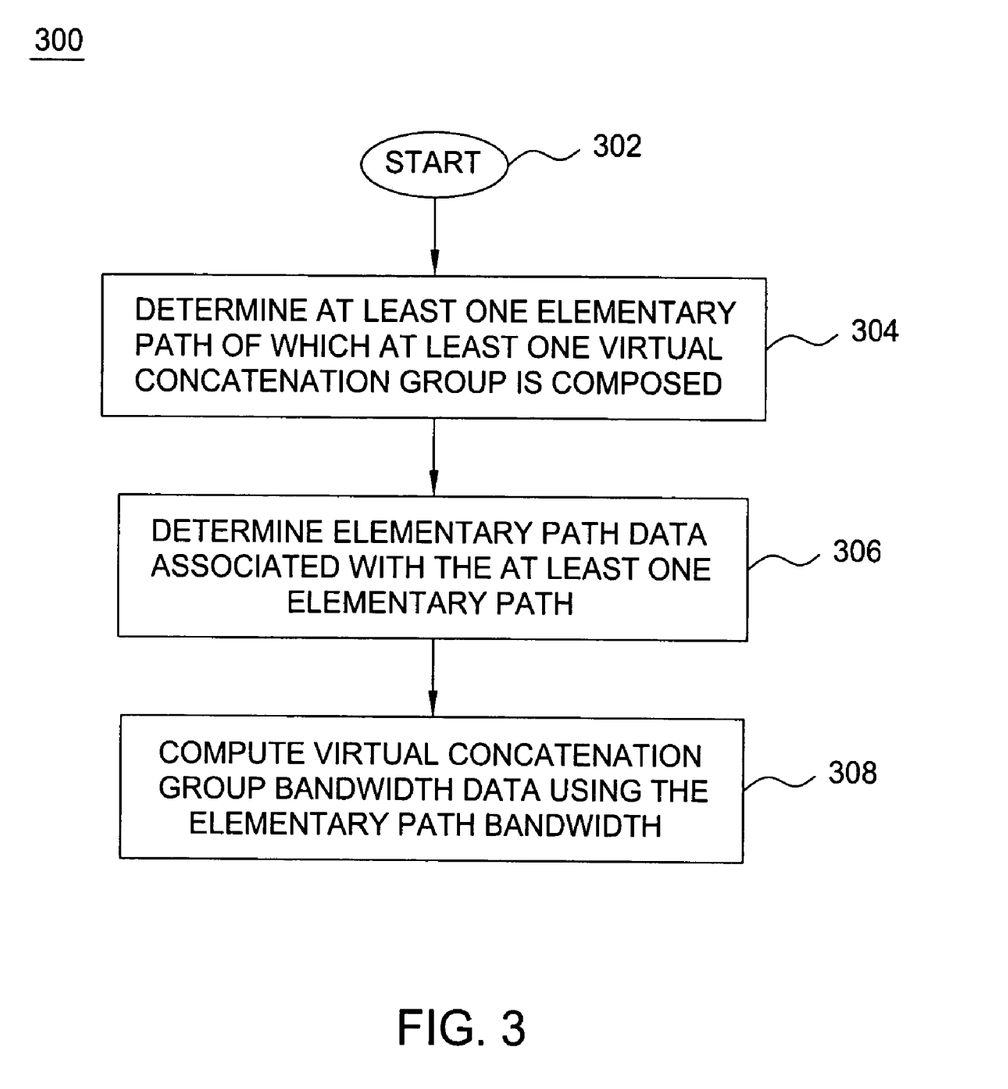
FIG. 3 depicts a flow diagram of a method according to one embodiment of the present invention.
Figure 4:
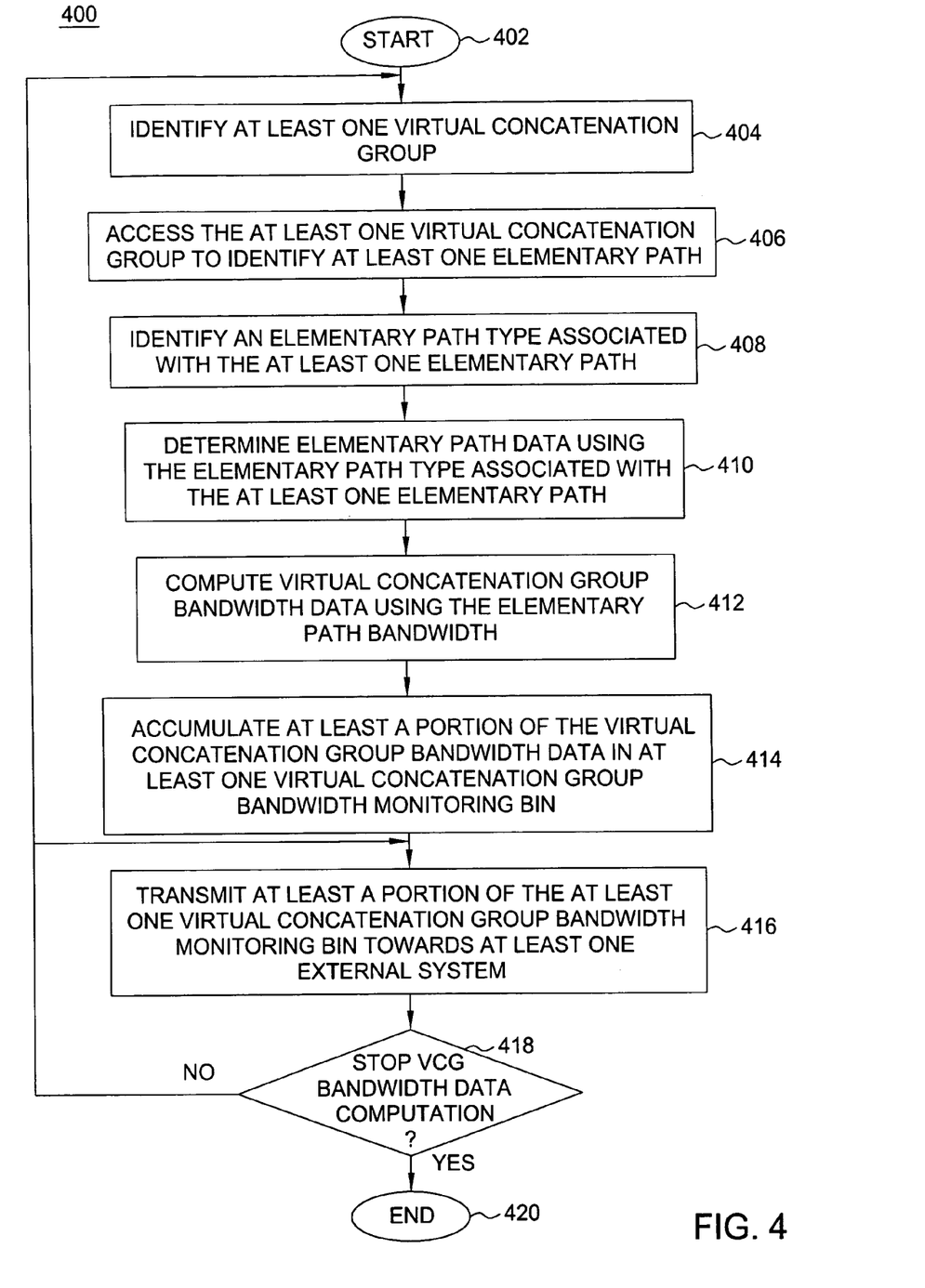
FIG. 4 depicts a detailed flow diagram of the method depicted in FIG. 3.

In one embodiment, the VCG bandwidth computation unit 240 performs the methodology of the present invention as described herein with respect to FIG. 3 and FIG. 4. In one embodiment, the methodology of the present invention is implemented by the VCG bandwidth computation unit 240 by accessing the elementary paths of at least one VCG transmitted via transmit port 232. In another embodiment, the methodology of the present invention is implemented by VCG bandwidth computation unit 240 by accessing the elementary paths of at least one VCG received via receive port 236.

In another embodiment, the methodology of the present invention is implemented by the VCG bandwidth computation unit 240 by accessing the elementary paths of at least one VCG transmitted via transmit port 232 and accessing the elementary paths of at least one VCG received via receive port 236. In another embodiment, in which the VCG bandwidth computation unit 240 accesses the elementary paths of a VCG via mapping-framing unit 220, the methodology of the present invention is implemented by the VCG bandwidth computation unit 240 using the mapping-framing unit 220.

As depicted in FIG. 2, processor 250 facilitates communication between the functional elements of network element 200. In one embodiment, processor 250 receives VCG bandwidth data from VCG bandwidth computation unit 240, and processes the VCG bandwidth data for storage in at least one of a memory (illustratively, memory 260), a local database (not shown), a remote database (not shown), and like components for storing information as known in the art. In one embodiment, at least a portion of the VCG bandwidth data associated with a VCG is accumulated in at least one VCG bandwidth data bin. In one such embodiment, the VCG bandwidth data is collected and organized in at least one of a fifteen minute VCG bandwidth data bin and a twenty-four hour VCG bandwidth data bin. Furthermore, in one embodiment, accumulated VCG bandwidth data is integrated over time to determine at least one total VCG bandwidth value.

In one embodiment, processor 250 retrieves at least a portion of the VCG bandwidth data in at least one VCG bandwidth data bin from memory 260. In one embodiment, the processor 250 adapts at least a portion of the retrieved VCG bandwidth information for display to an interface. In one embodiment, processor 250 passes the retrieved VCG bandwidth information to communication module 270 for transmission towards at least one external system (such as an element management system, a network management system, a service management system, a billing system and like systems) via at least one communication link (illustratively, communication link 280).

FIG. 3 depicts a flow diagram of a method according to one embodiment of the present invention. Specifically, FIG. 3 depicts a flow diagram of a method 300 for computing virtual concatenation group bandwidth data of at least one virtual concatenation group. The method 300 is entered at step 302 and proceeds to step 304.

At step 304, at least one elementary path of which the at least one virtual concatenation group is composed is determined. In one embodiment, determination of at least one elementary path of which the at least one virtual concatenation group is composed comprises identifying the at least one virtual concatenation group and accessing the at least one virtual concatenation group to identify the at least one elementary path.

At step 306, elementary path data associated with the at least one elementary path is determined. In one embodiment, the determination of elementary path data associated with at least one elementary path comprises identifying an elementary path type associated with the at least one elementary path and using the elementary path type to determine the elementary path data.

In one embodiment, the elementary path data determined for an elementary path comprises at least one elementary path bandwidth value. In one further embodiment, the at least one elementary path bandwidth value associated with an elementary path type may be retrieved from at least one mapping table stored in a memory (illustratively, memory 260), database, and like components for storing mapping tables as known in the art.

At step 308, VCG bandwidth data using the elementary path data is computed. In one embodiment, the VCG bandwidth data is a VCG bandwidth value. In one such embodiment, the VCG bandwidth value is computed by adding the elementary path bandwidths of each of the elementary paths of which the at least one VCG is composed. In another such embodiment, the VCG bandwidth is computed by multiplying each elementary path bandwidth by the number of elementary paths having that elementary path bandwidth (elementary path type), and then adding the resulting products.

Since elementary paths of a VCG may fail, a VCG may be composed of a combination of active elementary paths and failed elementary paths. In one such embodiment, in which at least one elementary path of a VCG has failed, the VCG bandwidth value is computed by adding the elementary path bandwidths of each of the respective active elementary paths of which the at least one VCG is composed. In this embodiment, elementary path bandwidth associated with the at least one failed elementary path is not used in order to compute the VCG bandwidth data.

FIG. 4 depicts a detailed flow diagram of the method depicted in FIG. 3 and described above. Specifically, FIG. 4 depicts a flow diagram of a method 400 for computing virtual concatenation group bandwidth data of at least one virtual concatenation group. Although depicted as being performed serially, those skilled in the art will appreciate that at least a portion of the steps of the method 400 may be performed contemporaneously. The method 400 is entered at step 402 and proceeds to step 404.

At step 404, at least one virtual concatenation group is identified. In one embodiment, the at least one virtual concatenation group is identified on the VCG-originating end of the at least one virtual concatenation group. In another embodiment, the at least one virtual concatenation group is identified on the VCG-terminating end of the at least one virtual concatenation group. In one embodiment, the at least one virtual concatenation group is identified via a network-side line interface. In another embodiment, the at least one virtual concatenation group is identified via a mapping-framing unit (or via a plurality of modules and components performing substantially the same functions as the mapping-framing unit 220 described herein).

At step 406, the at least one virtual concatenation group is accessed to identify at least one elementary path (constituent SONET/SDH path) of which the VCG is composed. An elementary path is any SONET/SDH data stream capable of being mapped into a VCG. In one embodiment, each elementary path included in the accessed VCG is identified. In one embodiment, the at least one virtual concatenation group is accessed via a network-side line interface. In another embodiment, the at least one virtual concatenation group is accessed via a mapping-framing unit (or via a plurality of modules and components performing substantially the same functions as the mapping-framing unit 220 described herein).

Since one or more elementary paths of a VCG may fail, a VCG may be composed of a combination of active elementary paths and failed elementary paths. As such, in one embodiment, identification of at least one elementary path of which the VCG is composed comprises identification of at least one active elementary path of which the VCG is composed. In this embodiment, failed elementary paths associated with a VCG are ignored for purposes of computing virtual concatenation group bandwidth data using elementary path data (active elementary path data).

At step 408, an elementary path type associated with the at least one elementary path is identified. In one embodiment, an elementary path type is determined for each elementary path of a VCG. With respect to SONET networks, elementary path types include VT-1.5, VT-2, VT-3, VT-6, STS1, STS3 and like elementary paths types supported by SONET networks. With respect to SDH, elementary path types include TU-11, TU-12, TU-2, TU-3, AU-3, AU-4 and like elementary path types supported by SDH networks.

At step 410, elementary path data is determined using the elementary path type associated with at least one elementary path. In one embodiment, in which an elementary path type is determined for each elementary path of a VCG, corresponding elementary path data is determined for each elementary path of the VCG. In one embodiment, elementary path data comprises at least one elementary path bandwidth value.

In one embodiment, the elementary path bandwidth is determined using an elementary path bandwidth mapping from each elementary path type to corresponding elementary path bandwidth values. In this embodiment, the elementary path bandwidth mapping may be retrieved from at least one of a memory, a database and like components for storing mappings as known in the art.

At step 412, virtual concatenation group bandwidth data is computed using the elementary path data. In one embodiment, in which the elementary path data is an elementary path bandwidth value associated with each of the elementary paths of the VCG, the virtual concatenation group bandwidth data is computed using the elementary path bandwidth value associated with each of the at least one elementary paths. In one embodiment, VCG bandwidth data is computed once per second. In another embodiment, VCG bandwidth data is computed at least once each minute.

At step 414, at least a portion of the virtual concatenation group bandwidth data is accumulated in at least one VCG bandwidth data bin. In one embodiment, the at least one VCG bandwidth data bin comprises virtual concatenation group bandwidth data collected within a fifteen minute period. In another embodiment, the at least one VCG bandwidth data bin comprises virtual concatenation group bandwidth data collected within a twenty-four hour period. In one embodiment, the at least one VCG bandwidth data bin is stored locally. In another embodiment, at least a portion of the at least one VCG bandwidth data bin is stored remotely in a remote database.

At step 416, at least a portion of the at least one VCG bandwidth data bin is transmitted towards at least one external system. The transmission of at least a portion of the at least one VCG bandwidth data bin is performed in response to at least one of an automated request, a user-initiated request and like methods of initiating data transfers. The transmission of at least a portion of the at least one VCG bandwidth data bin is performed using any method of performing data transfers as known in the art.

In one embodiment, the at least one VCG bandwidth data bin is transmitted towards at least one of an element management system, a network management system, a service management system, a billing system and like systems. In one further embodiment, the at least one external system receives the at least a portion of the at least one virtual concatenation group bandwidth data bin and uses the at least a portion of the at least one virtual concatenation group bandwidth data bin to compute at least one bill.

At step 418, determine whether the calculation of VCG bandwidth data will continue or stop. If the calculation of VCG bandwidth data stops, method 400 optionally proceeds to step 420 where method 400 ends. If the calculation of VCG bandwidth data continues, method 400 optionally proceeds to step 404 where method 400 continues. Regardless of a determination that calculation of VCG bandwidth data stops or continues, method 400 optionally proceeds to step 416, at which point at least a portion of the at least one VCG bandwidth data bin may be transmitted towards at least one external system.

In one embodiment, at least a portion of the VCG bandwidth data accumulated in the at least one VCG bandwidth data bin is integrated over time. The integration of VCG bandwidth data over time is used to compute at least one total VCG bandwidth value. The at least one total VCG bandwidth value may be computed for at least one of a specific length of time and a specific period of time. The at least one total VCG bandwidth value may be stored locally or, optionally, transmitted towards at least one external system.

Figure 5:
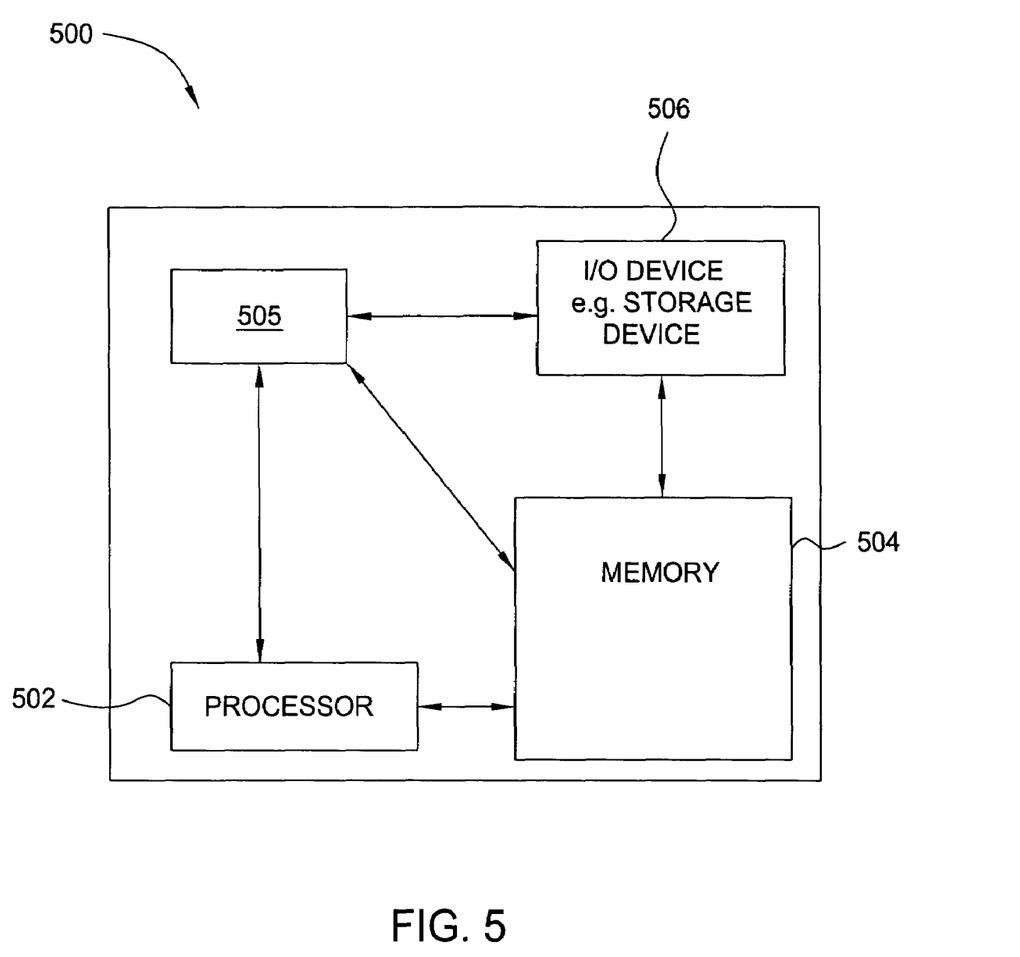
FIG. 5 depicts a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a VCG bandwidth calculation module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present VCG bandwidth calculation module or process 505 can be loaded into memory 504 and executed by processor 502 to implement the functions as discussed above. As such, the present VCG bandwidth calculation process 505 (including associated data structures) of the present invention can be stored on a computer readable medium or carrier, e.g., RAM memory, magnetic or optical drive or diskette and the like.

In one embodiment, the methodologies of the present invention are performed on a VCG-originating node (a node that concatenates elementary paths in order to form a VCG). In another embodiment, the methodologies of the present invention are implemented on VCG-terminating node (a node that de-concatenates VCGs in order to extract and route the constituent elementary paths).

In one embodiment, asymmetric bandwidth allocation is implemented between the VCG-originating node and the VCG-terminating nods. In this embodiment, the methodologies of the present invention may be implemented on both the VCG-originating and VCG-terminating nodes. In this embodiment, calculation of accurate VCG bandwidth data for billing purposes is determined by at least one of a network management system, an element management system, a service management system, and a billing system (either singly or in combination) using the combination of the VCG bandwidth data obtained from the VCG-originating and VCG-terminating nodes.

Although various embodiments which incorporate the teachings of the present invention have been shown and described in detail herein, those skilled in the art can readily devise many other varied embodiments that still incorporate these teachings.

What is claimed is:

1. A method for accumulating virtual concatenation group bandwidth data at a node, comprising:
    (a) determining, at the node, at least one elementary path of which a virtual concatenation group is composed;
    (b) determining, for each elementary path, elementary path data comprising an elementary path bandwidth value;
    (c) computing a virtual concatenation group bandwidth value for said virtual concatenation group using said elementary path bandwidth values; and
    (d) accumulating virtual concatenation group bandwidth values for said virtual concatenation group by periodically repeating steps (a)-(c).

2. The method of claim 1, wherein determining said at least one elementary path comprises:
    identifying said virtual concatenation group; and
    accessing said virtual concatenation group to identify said at least one elementary path.

3. The method of claim 2, wherein said identifying said virtual concatenation group is performed on at least one of a virtual concatenation group originating node and a virtual concatenation group terminating node.

4. The method of claim 2, wherein said at least one elementary path comprises at least one active elementary path.

5. The method of claim 1, wherein said determination of elementary path data associated with said at least one elementary path comprises:
    identifying, for each of said at least one elementary path, an elementary path type associated with said at least one elementary path; and
    determining, for each of said at least one elementary path, said elementary path bandwidth value using said elementary path type.

6. The method of claim 1, wherein each of said at least one elementary path substantially conforms to at least one of a VT-1.5, VT-2, VT-3, VT-6, STS1, STS3, TU-11, TU-12, TU-2, TU-3, AU-3, and AU-4.

7. The method of claim 1, wherein said accumulation of said virtual concatenation group bandwidth values is performed by periodically repeating steps (a)-(c) at least once each minute.

8. The method of claim 1, further comprising:
    integrating at least a portion of said virtual concatenation group bandwidth values for computing at least one total virtual concatenation group bandwidth value.

9. The method of claim 1, wherein said virtual concatenation group bandwidth values are accumulated in at least one virtual concatenation group bandwidth data bin.

10. The method of claim 9, wherein said at least one virtual concatenation group bandwidth data bin comprises virtual concatenation group bandwidth values collected within at least one of a fifteen minute period and a twenty-four hour period.

11. The method of claim 9, wherein said at least one virtual concatenation group bandwidth data bin is stored locally.

12. The method of claim 9, wherein at least a portion of said at least one virtual concatenation group bandwidth data bin is transmitted towards at least one external system.

13. The method of claim 12, wherein said at least one external system is at least one of an element management system, a network management system, a service management system, and a billing system.

14. The method of claim 12, further comprising:
    receiving, by said at least one external system, at least a portion of said at least one virtual concatenation group bandwidth data bin; and
    computing at least one bill using said at least a portion of said at least one virtual concatenation group bandwidth data bin.

15. An apparatus, comprising:
    means for determining at least one elementary path of which a virtual concatenation group is composed;
    means for determining, for each elementary path, elementary path data comprising an elementary path bandwidth value;
    means for computing a virtual concatenation group bandwidth value for said virtual concatenation group using said elementary path bandwidth values; and
    means for accumulating virtual concatenation group bandwidth values for said virtual concatenation group by periodically computing said virtual concatenation group bandwidth value for said virtual concatenation group.

16. The apparatus of claim 15, wherein said means for determining at least one elementary path comprises:
    means for identifying said virtual concatenation group; and
    means for accessing said virtual concatenation group to identify said at least one elementary path.

17. The apparatus of claim 15, wherein said means for determining elementary path data associated with said at least one elementary path comprises:
    means for identifying, for each of said at least one elementary path, an elementary path type associated with said at least one elementary path; and
    means for determining, for each of said at least one elementary path, said elementary path bandwidth value using said elementary path type.

18. The apparatus of claim 15, wherein said means for accumulating virtual concatenation group bandwidth values for said virtual concatenation group accumulates said virtual concatenation group bandwidth values in at least one virtual concatenation group bandwidth data bin.

19. A computer readable storage medium storing a software program, that, when executed by a computer, causes the computer to perform a method comprising:
    (a) determining at least one elementary path of which a virtual concatenation group is composed;
    (b) determining, for each elementary path, elementary path data comprising an elementary path bandwidth value;
    (c) computing a virtual concatenation group bandwidth value for said virtual concatenation group using said elementary path bandwidth values; and
    (d) accumulating virtual concatenation group bandwidth values for said virtual concatenation group by periodically repeating steps (a)-(c).

* * * * *